(12) United States Patent
Liao

(10) Patent No.: US 6,390,261 B1
(45) Date of Patent: May 21, 2002

(54) WIRE-WINDING BOX CAPABLE OF DETECTING THE LINE

(76) Inventor: Sheng Hsin Liao, No. 10, Alley 38, Lane 299, San Chun St., Shulin, Taipei Hsien (TW)

(*) Notice: Subject to any disclaimer, the term of this patent is extended or adjusted under 35 U.S.C. 154(b) by 0 days.

(21) Appl. No.: 09/731,032

(22) Filed: Dec. 7, 2000

(30) Foreign Application Priority Data

Nov. 15, 2000 (TW) ...................................... 89219798 U

(51) Int. Cl.$^7$ .............................................. H02G 11/00
(52) U.S. Cl. ................................................ 191/12.2 R
(58) Field of Search ...................... 191/12 R, 12.2 R, 191/12.4; 242/388.1; 324/556

(56) References Cited

U.S. PATENT DOCUMENTS

| | | | | |
|---|---|---|---|---|
| 3,705,962 A | * | 12/1972 | Banister .................... | 191/12.4 |
| 5,101,082 A | * | 3/1992 | Simmons et al. ...... | 191/12.2 R |
| 5,551,545 A | * | 9/1996 | Gelfman ................ | 191/12.2 A |
| 6,079,657 A | * | 6/2000 | Hwang .................... | 242/388.1 |
| 6,253,893 B1 | * | 7/2001 | Chi-Min .................... | 191/12.4 |

* cited by examiner

Primary Examiner—S. Joseph Morano
Assistant Examiner—Robert J. McCarry, Jr.
(74) Attorney, Agent, or Firm—Rosenberg, Klein & Lee

(57) ABSTRACT

The present invention proposes a wire-winding box capable of detecting the line, which box comprises a wire-winding box and a detection circuit unit. The wire-winding box comprises a housing, a winding disk, a communication wire, and a scroll spring. The winding disk is installed in the housing and can rotate. The communication wire is wound around the winding disk. The scroll spring is placed between the housing and the winding disk. The detection circuit unit is installed in the housing, and properly joins the communication wire. Thereby, the present invention can be used for pulling and winding a communication wire, and can also be used to detect and judge whether the communication line is open-circuited or misplaced, or has a too-large current. Therefore, the problems can be troubleshot betimes, and destruction of the communication equipment due to wrong plugging can be prevented.

6 Claims, 6 Drawing Sheets

WIRE-WINDING BOX CAPABLE OF DETECTING THE LINE

FIELD OF THE INVENTION

The present invention relates to a wire-winding box capable of detecting the line and, more particularly, to a wire-winding box, which can be used for pulling and winding a communication wire so that disorder and entanglement of wire can be avoided, and can also be used to detect and display the line status of the communication wire for troubleshooting or preventing misusage.

BACKGROUND OF THE INVENTION

Appropriate communication wires need to be accommodated to achieve electrical connection when using communications apparatuses such as computers, modems, telephones, or facsimile apparatuses. To avoid entanglement of wire due to a too-long length of external wire or inconvenience of use due to a too-short length of external wire, several kinds of wire-winding boxes applicable to various kinds of communications apparatuses have been proposed. A wire-winding box comprises basically at least a winding disk received in a housing. A communication wire is wound around the winding disk, which is held by a scroll spring so as to be able to wind at any time. The ways of electrical connection of the communication wire and the types of the structure of the winding disk are manifold. However, all kinds of wire-winding boxes can only be used for communication connection and wire winding, and cannot provide other auxiliary functions pertaining to communication line or communication equipments so that they cannot enhance the resources when confronting with problems of bad communication or malfunction. Therefore, abnormal communication situation can not be prevented in advanced. Especially, whether the communication line is normally or abnormally open-circuited so as to influence the use of the communication equipment, or whether the communication line is wrongly misplaced so that the communication equipment cannot be used, or whether the communication line causes a too-large current due to different specification of national telecommunications standards so as to result in destruction of the communication equipment, cannot be known in advance.

SUMMARY OF THE INVENTION

The primary object of the present invention is to provide a wire-winding box capable of detecting the line, which box can be used for pulling and winding a communication wire, and can also be used to detect the line status of the communication wire. The present invention is characterized in that a detection circuit unit is built in a wire-winding box so that a user can plug it in a communication socket to detect and judge whether the communication line is open-circuited or misplaced, or has a too-large current. Thereby, he can recondition the situation betimes, or prevent the destruction of the communication equipment due to wrong plugging.

The various objects and advantages of the present invention will be more readily understood from the following detailed description when read in conjunction with the appended drawings, in which:

DETAILED DESCRIPTION OF THE PREFERRED EMBODIMENTS

Figure 1:
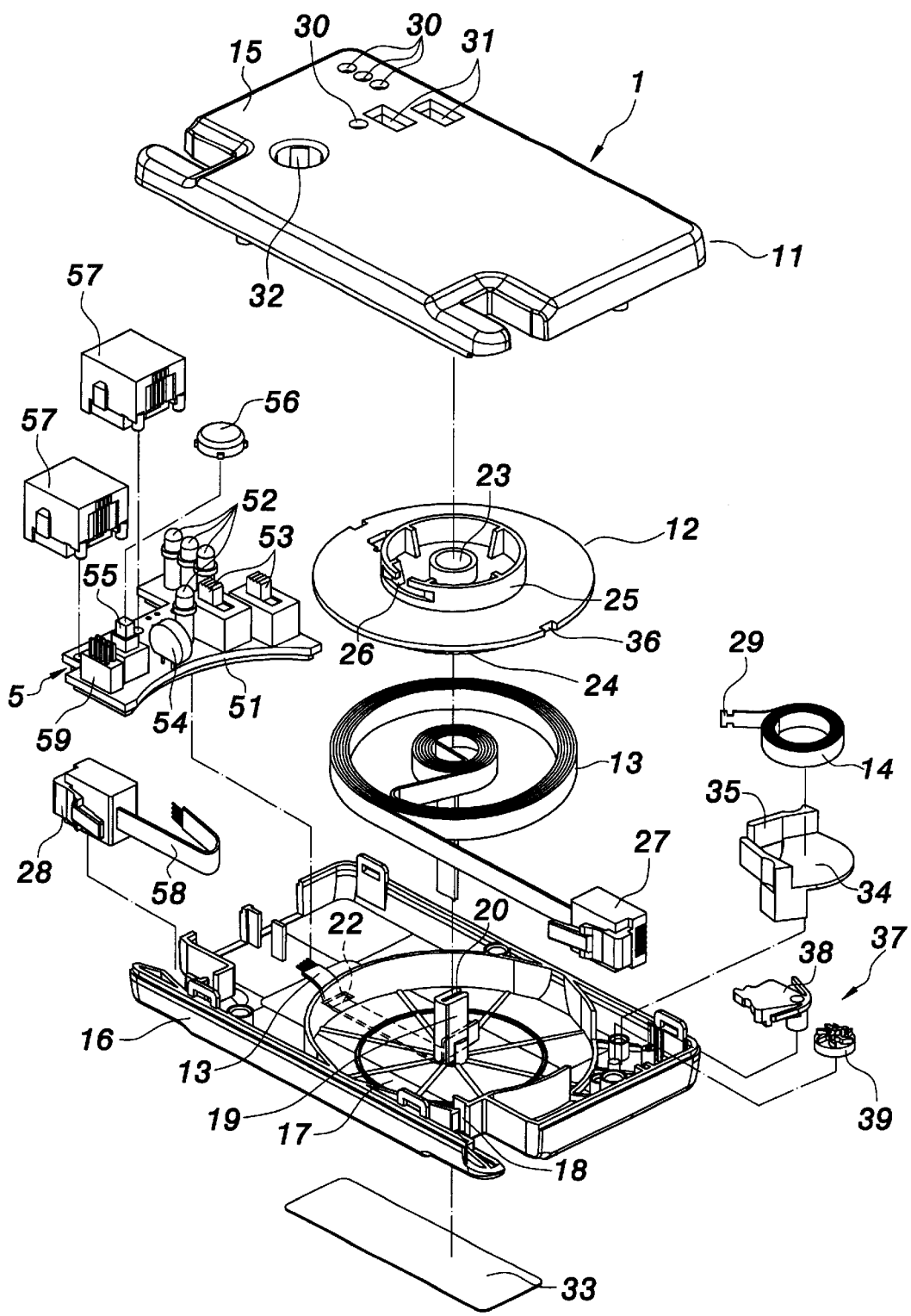
FIG. 1 is an exploded perspective view of the present invention.
Figure 2:
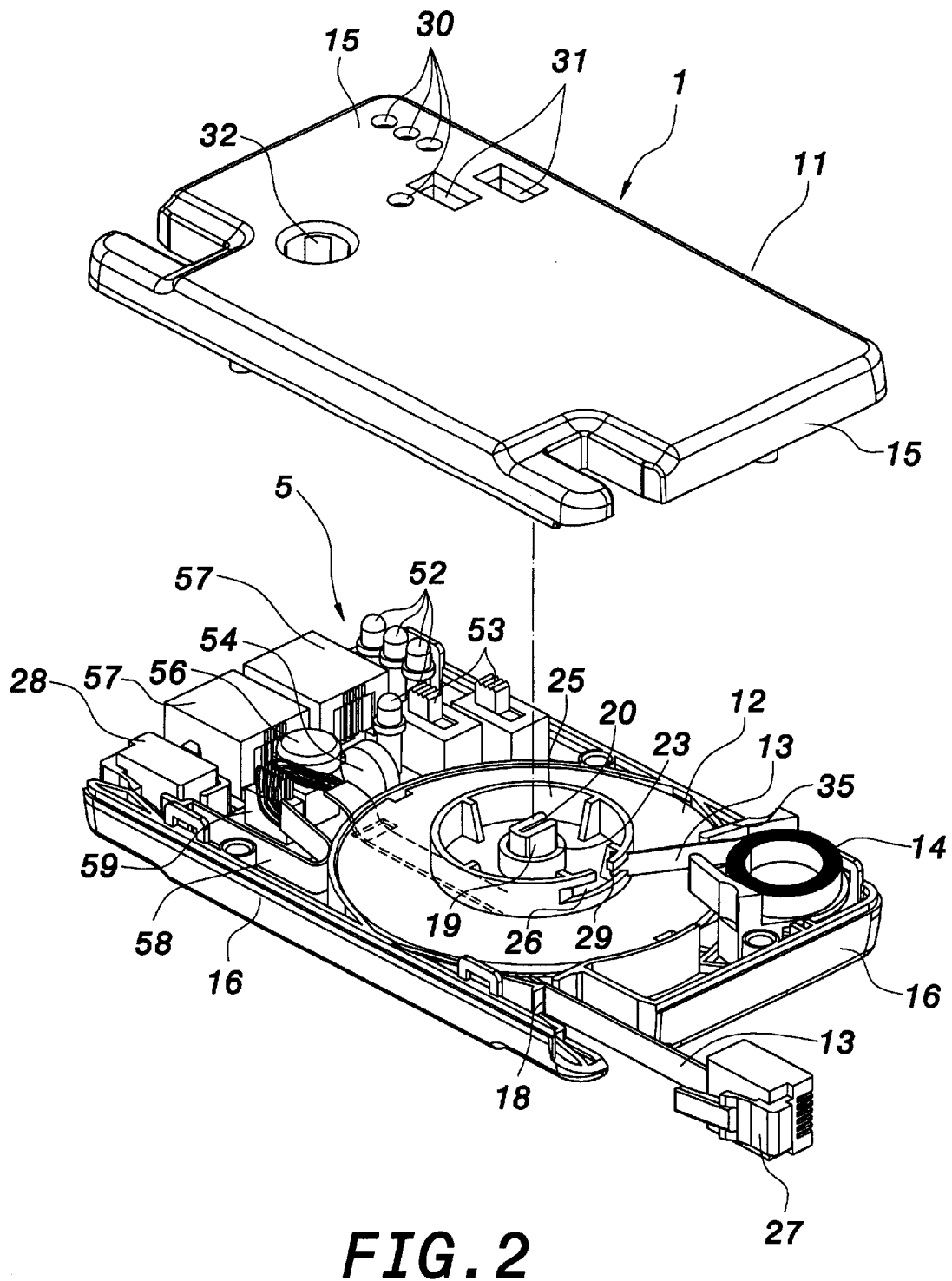
FIG. 2 is a perspective assembly view of the present invention.
Figure 3:
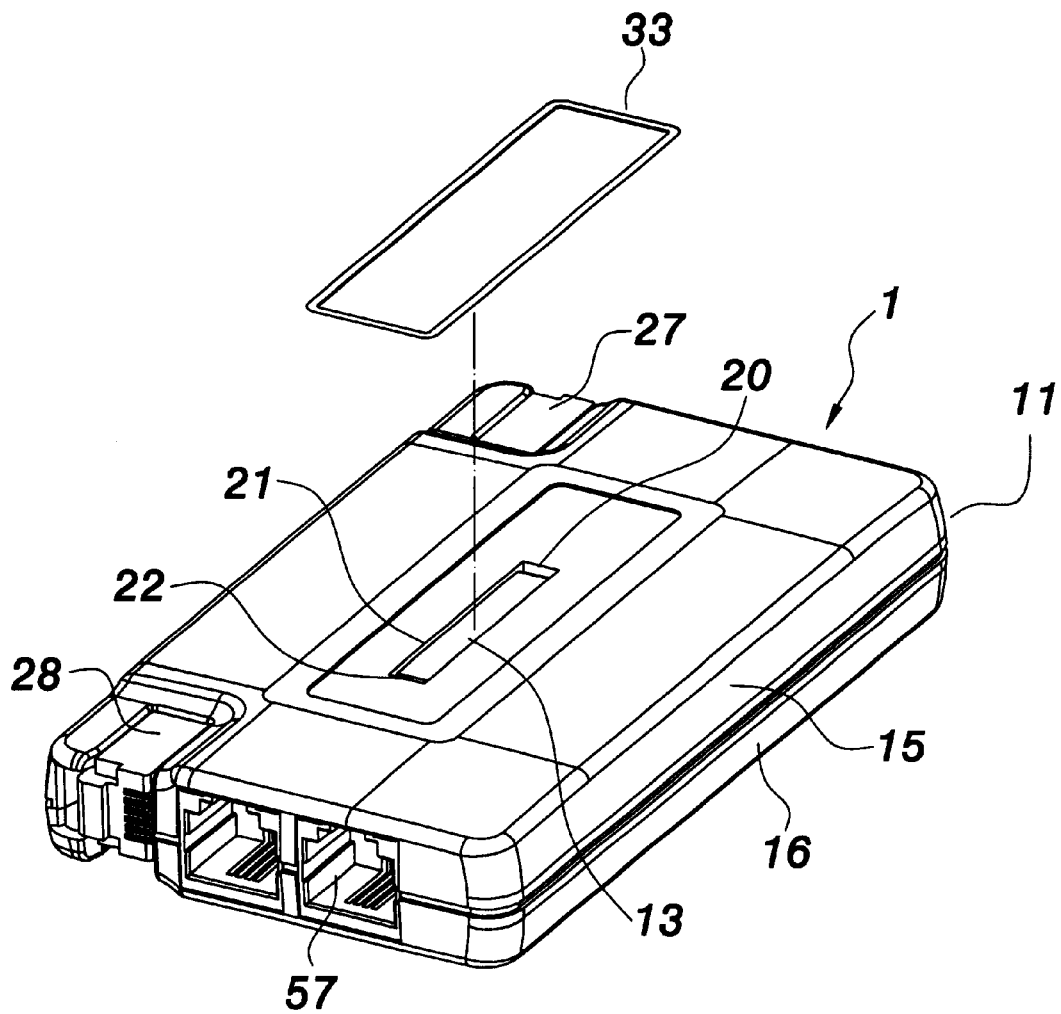
FIG. 3 is a perspective view of the present invention.
Figure 4:
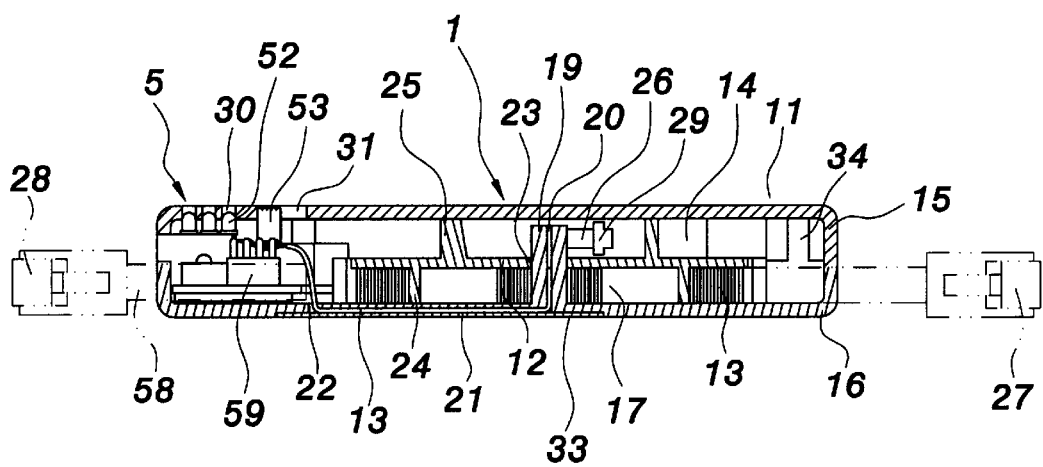
FIG. 4 is a cross-sectional view of the present invention.

As shown in FIGS. 1 to 4, a wire-winding box capable of detecting the line of the present invention comprises a wire-winding box 1 of any type of proper structure and a detection circuit unit 5.

The wire-winding box 1 can be any wire-winding box of any type of proper structure. The wire-winding box 1 according to an embodiment of the present invention comprises a housing 11, a winding disk 12, a communication wire 13, and a scroll spring 14. The housing 11 is formed of an upper shell 15 and a lower shell 16 by fastening or screwing so as to form a hollow shell body. The housing 11 has a wire tank 17 therein to receive the communication wire 13. A wire hole 18 is formed at a proper position on the side of the wire tank 17 so that one end of the communication wire 13 can protrude out. A projective shaft 19 is installed at the center of the inner side surface of the wire tank 17. A through groove 20 is axially formed in the projective shaft 19. The through groove 20 penetrates through the housing 11 and joins one end of a groove 21 on the outer side surface of the housing 11. The other end of the groove 21 joins a through hole 22 penetrating through the housing 11.

The winding disk 12 is a circular disk with a central axial hole 23 formed thereon. A winding ring 24 and a spring-fixing post 25 are installed on two surfaces of the winding disk 12, respectively. The spring-fixing post 25 has a fastening hole 26 thereon. The winding disk 12 is received in the wire tank 17 of the housing 11. The winding disk 12 is pivotally installed on the projective shaft 19 via the axial hole 23 so that the winding disk can rotate in the wire tank 17.

Two ends of the communication wire 13 join a first communication plug 27 and a second communication plug 28, respectively. The communication wire 13 is received in the wire tank 17 of the housing 11. The communication wire 13 is properly wound around the winding ring 24 of the winding disk 12 and the projective shaft 19. One end of the communication wire 13 protrudes out of the wire hole 18 of the housing 11 to join the first communication plug 27. The other end of the communication wire 13 protrudes out of the housing 11 via the through groove 20 of the projective shaft 19, extends along the groove 21, and then penetrates into the housing 11 via the through hole 22 to join the second communication plug 28 through the detection circuit unit 5. A decorative plate 33 can be installed outside the through groove 20, the groove 21, and the through hole 22 to cover them so that delicacy can be enhanced and brands or advertisements can be attached thereon.

The scroll spring 14 is properly positioned in the housing 11 and outside the wire tank 17. A fastening end 29 of the scroll spring 14 is fastened in the fastening hole 26 of the winding disk 12 so that the scroll spring 14 and the winding disk 12 can be joined together. The scroll spring 14 can store energy when the winding disk 12 rotates.

The detection circuit unit 5 is properly installed in the housing 11 and outside the wire tank 17. The detection circuit unit 5 comprises a circuit board 51, a plurality of light-emitting diodes (LED) 52, a plurality of adjustment switches 53, a surge receiver 54, and a detection switch 55. The count and colors of the LEDs 52 can vary according to different designs of practical detection circuits. For instance, one LED can display whether the communication line is close-circuited or open-circuited, another LED can display whether the communication line is misplaced through its color or flashing, another LED can display whether the provided current of the communication line is too large through its color or flashing, and yet another LED can display whether the surge is normal through its color or flashing. Therefore, a user can be informed to recondition the problems betimes. Moreover, destruction of the communication equipment due to wrongly plugging into a communication socket of too-large current can be prevented.

Corresponding light holes 30 are formed on the housing 11 to facilitate the display of the LEDs 52. The adjustment switches 53 can be used for switching between inverse levels of the communication wire. Corresponding openings 31 are formed on the housing 11 so that the adjustment switches 53 can protrude out to facilitate the switching of the adjustment switches 53. The detection switch 55 can be used to determine whether the detection circuit unit 5 is used. A detection button 56 is formed on the detection switch 55. A corresponding opening 32 is formed on the housing 11 so that the detection button 56 of the detection switch 55 can protrude out to facilitate the pressing of the detection button 56. A spare socket 57 can be installed on the circuit board 51 of the detection circuit unit 5 for connecting an extension wire so that a plurality of wire-winding boxes can be concurrently used.

The other end of the communication wire 13 protrudes out of the housing 11 via the through groove 20 of the projective shaft 19, extends along the groove 21, penetrates into the housing 11 via the through hole 22, and then is connected to a connector 59 on the circuit board 51 of the detection circuit unit 5. Thereby, the communication wire 13 can be electrically connected to the detection circuit unit 5. The connector 59 is further connected to the second communication plug 28 through a section of connection wire 58 so that the communication wire 13 can be connected to the second communication plug 28 through the detection circuit unit 5.

Figure 5:
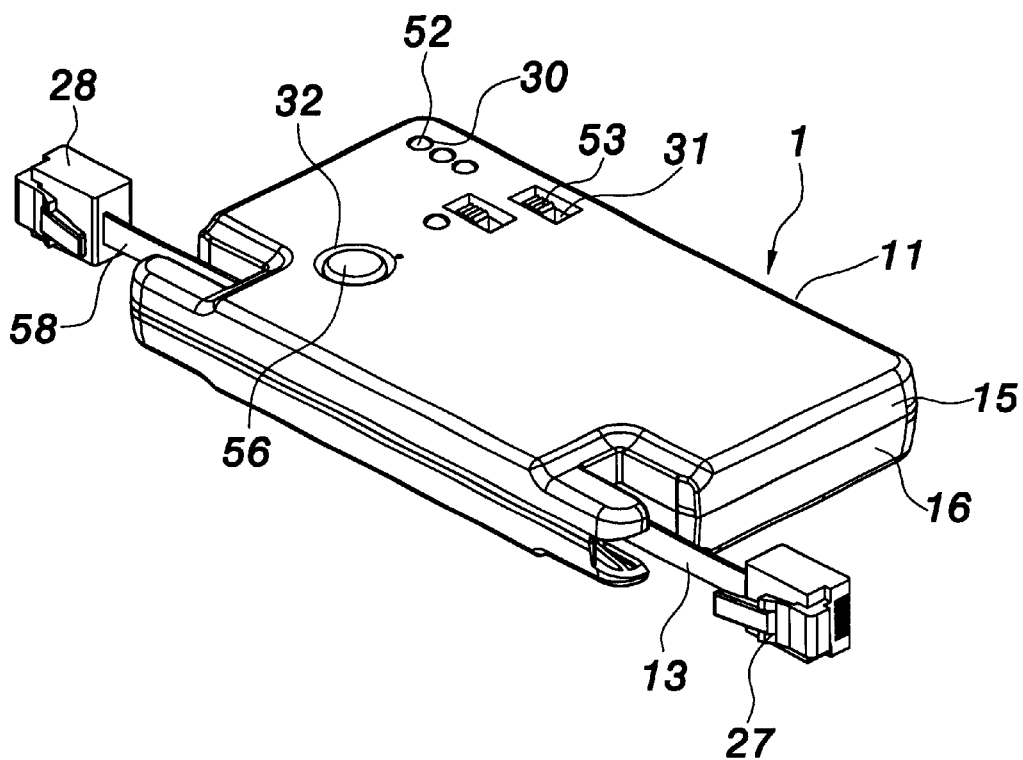
FIG. 5 is a view showing a use state of the present invention.
Figure 6:
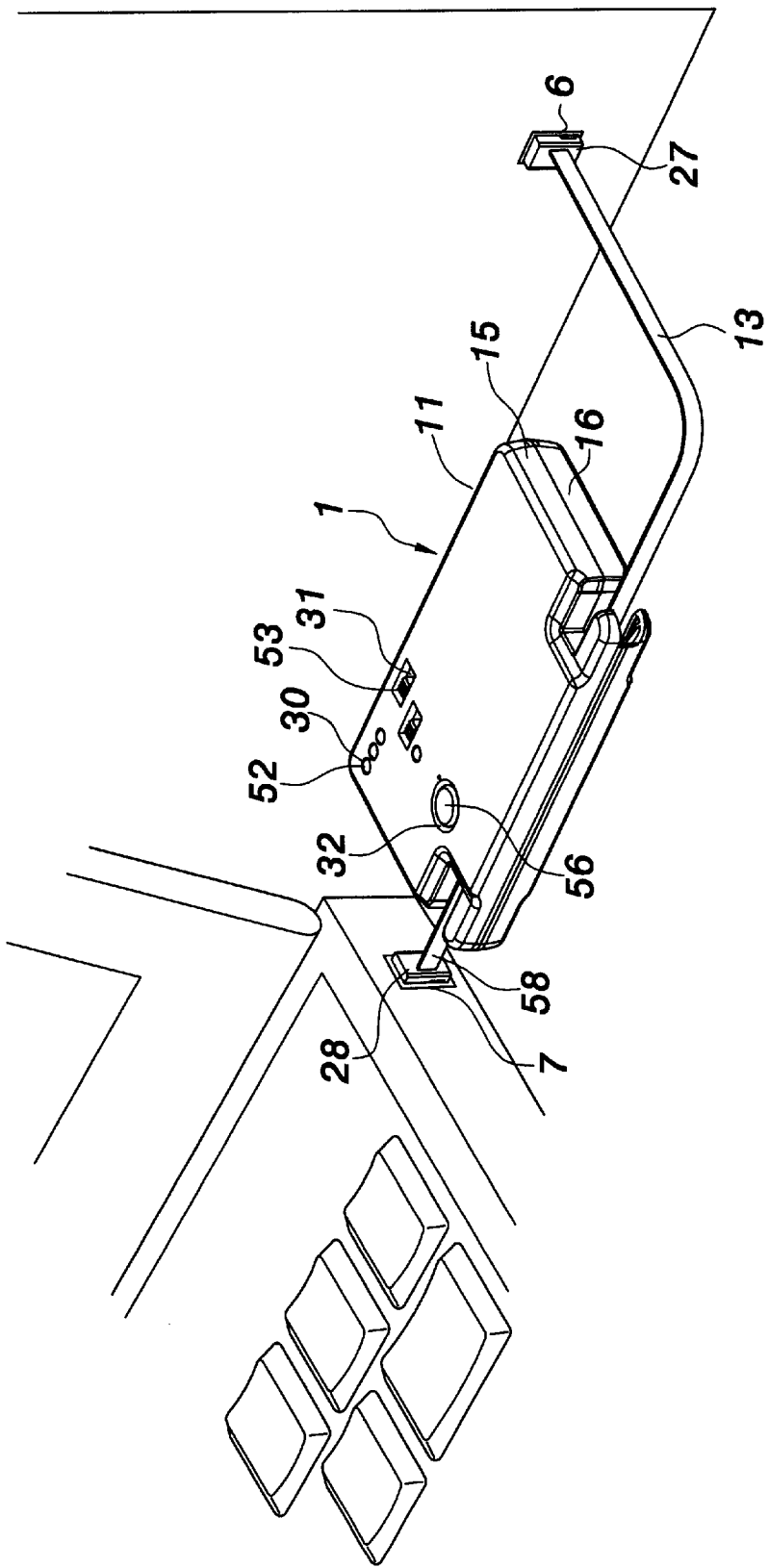
FIG. 6 is a view showing another use state of the present invention.

Thereby, a wire-winding box 1 can be assembled, as shown in FIG. 5. In practical use, a long length of the communication wire 13 can be wound and received using the wire-winding box. A user can plug the communication plugs 27 and 28 at the two ends of the communication wire 13 into corresponding sockets 6 and 7 of communication equipments for communication of information, as shown in FIG. 6. The two ends of the communication wire 13 can be directly pulled out from the wire-winding box. A certain restoring tensile force can be kept due to the action of the scroll spring 14 on the communication wire 13 so that the communication wire 13 can be wound back into the wire-winding box successfully. Thereby, entanglement of wire due to a too-long length of external wire will not arise.

A bearing seat 34 can be installed in the housing 11 of the wire-winding box 1. Two retaining plates 35 extend from two sides of the bearing seat 34 so that the scroll spring 14 can be placed between the two retaining plates and the wall of the housing 11. Furthermore, a plurality of fastening grooves 36 are formed on the edge of the winding disk 12 and a reciprocating control device 37 is installed adjacent to the winding disk 12 so that the user will not be disturbed due to the tensile force when he pulls out the communication wire 13. The reciprocating control device 37 comprises a swing plate 38 capable of swinging freely and a rag wheel 39 capable of rotating freely. Through the interactive functionality of the swing plate 38, the rag wheel 39, and the fastening groove 36 of the winding disk 12, the communication wire 13 can be fixed or received by winding through reciprocating actions of pull and release.

The present invention can be used for pulling and winding a communication wire, and can also be used to detect the line status of the communication wire through the detection circuit unit 5 connected to the communication wire 13. A user can plug the communication plugs into communication sockets to detect and display whether the communication line is open-circuited or misplaced, or has a too-large current through the colors or flashing or the LEDs 52. Thereby, he can recondition the situation betimes, or prevent the destruction of the communication equipment due to wrong plugging.

To sum up, the present invention provides a wire-winding box, which can be used for pulling and winding a communication wire, and can also be used to detect and display the line status of the communication wire.

Although the present invention has been described with reference to the preferred embodiments thereof, it will be understood that the invention is not limited to the details thereof. Various substitutions and modifications have been suggested in the foregoing description, and others will occur to those of ordinary skill in the art. Therefore, all such substitutions and modifications are intended to be embraced within the scope of the invention as defined in the appended claims.

I claim:

1. A combined wire-winding box and circuit for detecting line status, comprising:

a wire-winding box comprising a housing, a winding disk, a communication wire, and a scroll spring, a wire tank being formed in said housing to receive said communication wire and said winding disk therein, said winding disk being pivotally installed in said wire tank for rotation therein, said communication wire being wound around said winding disk, said scroll spring being installed between said housing and said winding disk; and a detection circuit unit installed in said housing and connected to said communication wire, said detection circuit unit detecting at least one condition selected from the group consisting of a properly connected circuit, an open circuit, crossed lines, and over current, said detection circuit unit including at least one light-emitting diode for indicating said detected condition.

2. The combined wire-winding box as claimed in claim 1, wherein said housing has a projective shaft formed therein for pivotally supporting said winding disk thereon, said projective shaft having a through groove formed therein, said through groove penetrating through said housing and joining one end of a groove formed on an outer side surface of said housing, an other end of said groove joining a through hole which penetrates through said housing, one end of said communication wire protruding out of said housing via said through groove of said projective shaft, extending along said groove, penetrating into said housing via said through hole, and then being connected to said detection circuit unit.

3. The combined wire-winding box as claimed in claim 1, further comprising a bearing seat installed in said housing, and two retaining plates extending from two sides of said bearing seat so that said scroll spring can be placed between said bearing seat and a wall of said housing.

4. The combined wire-winding box as claimed in claim 1, further comprising a reciprocating control device installed in said housing so that said communication wire can be fixed or wound through reciprocating actions of pull and release of said communication wire.

5. The combined wire-winding box as claimed in claim 1, wherein said detection circuit unit comprises a circuit board, a plurality of light-emitting diodes coupled to said circuit board, a plurality of adjustment switches coupled to said circuit board, a surge receiver coupled to said circuit board, and a detection switch coupled to said circuit board for enabling and disabling said detection circuit unit, said housing having a plurality of light holes and openings formed for said light-emitting diodes, said adjustment switches, and said detection switch to protrude therethrough, one end of said communication wire joining a connector on said circuit board, said connector being connected to a communication plug through a connection wire.

6. The combined wire-winding box as claimed in claim 1, further comprising a spare connector socket connected to said detection circuit unit.

\* \* \* \* \*